United States Patent [19]

Glockner et al.

[11] Patent Number: 5,277,223

[45] Date of Patent: Jan. 11, 1994

[54] VALVE POSITION TRANSMITTER

[76] Inventors: Gary G. Glockner, 128 Willow Wind Dr., Columbia, S.C. 29210; John Unoski; Robert Unoski, both of 56 Ivy Pl., Wayne, N.J. 07470

[21] Appl. No.: 962,629

[22] Filed: Oct. 16, 1992

[51] Int. Cl.⁵ ............................................. F16K 37/00
[52] U.S. Cl. ................................... 137/554; 137/315; 137/556
[58] Field of Search ..................... 137/554, 556, 315; 116/277

[56] References Cited

U.S. PATENT DOCUMENTS

| | | | |
|---|---|---|---|
| 2,829,538 | 4/1958 | Mueller | 74/548 |
| 2,984,127 | 5/1961 | Schwenk | 74/801 |
| 3,148,701 | 9/1964 | Bagwell | 137/556 |
| 3,238,968 | 3/1966 | Pecis | 137/556 |
| 3,329,159 | 7/1967 | Herion | 137/556 |
| 3,430,605 | 3/1969 | Wood | 116/129 |
| 3,656,504 | 4/1972 | Topinka | 137/363 |
| 3,804,056 | 4/1974 | Lee et al. | 116/125 |
| 3,910,308 | 10/1975 | Mack | 137/553 |
| 4,046,350 | 9/1977 | Massey et al. | 251/58 |
| 4,095,421 | 6/1978 | Silcox | 137/236.1 |
| 4,194,529 | 3/1980 | Hargraves et al. | 137/557 |
| 4,494,565 | 1/1985 | Sinclair et al. | 137/556 |
| 4,494,566 | 1/1985 | Sinclair et al. | 137/556 |
| 4,531,534 | 7/1985 | Magil et al. | 137/556 |
| 4,721,131 | 1/1988 | Ciordinik et al. | 137/554 |
| 4,893,582 | 1/1990 | Kalamon et al. | 116/277 |
| 4,926,903 | 5/1990 | Kawai | 137/554 |

FOREIGN PATENT DOCUMENTS 8905938  6/1989  World Int. Prop. O. .......... 137/554

OTHER PUBLICATIONS

Quartz Design Advertisement for valve position sensor—(referencing U.S. Pat. No. 4,962,290), 1991.
Automax Incorporated advertisement from Thomas Register for Ultraswitch device. Automax, Cincinnati, Ohio, 1991.
Worcester Controls advertisement for valve position indicator, A & M Industrial Supply, 1991.

Primary Examiner—A. Michael Chambers
Attorney, Agent, or Firm—Eugene G. Reynolds

[57] ABSTRACT

A valve position transmitter which is comprised of an indicator assembly having a base with an aperture located thereon, an adjusting ring placed on the base about the aperture, an indicator member capable of identifying the operational position of a remote valve said indicator member being positioned on the adjusting ring, and a transparent cover placed about said indicator and secured to the base of the indicator assembly. Said valve position transmitter also comprising a shaft assembly extending from the point where it may be coupled to a valve through the aperture in the base of the indicator assembly to a point where it engages with the indicator member such that any rotation of the shaft assembly is sensed by said indicator member and some display with respect to such rotation is made. The valve position transmitter may also be comprised of a switch box assembly comprising a housing wherein are located switches for detecting rotation in the shaft member, said switches being electrically connected to a terminal strip and in turn said terminal strip being connected to remote peripheral devices. Said valve position transmitter may also be comprised of a split shaft assembly wherein upper and lower shaft members are provided for such that a peripheral device may be permanently coupled to said upper shaft member and it may be removed along with the upper shaft member to allow for easy field servicing of the remainder of the device.

32 Claims, 4 Drawing Sheets

VALVE POSITION TRANSMITTER

BACKGROUND OF THE INVENTION

1. Field of the Invention

This invention relates to valve position transmitters in general and more particularly to a valve position transmitter designed to preclude the misalignment of the transmitter during reassembly in the field—thereby precluding the improper designation of valve position, designed to facilitate the use of peripheral devices with the transmitter, and designed to minimize the damage to the transmitter resulting from the conditions in which it is used.

2. Description of the Prior Art

Valve position transmitters are known and are used to identify the relative operational position of a valve located in a separate valve assembly. Quite often valve position transmitters are utilized in hazardous environments to allow for the identification of a valve's position from a safe and remote distance. Furthermore, valve position transmitters are often used when the valve assembly itself is remotely situated and difficult to reach.

Existing valve position transmitters, however, are susceptible to misuse and damage. For example, it often becomes necessary during the course of regular maintenance to disassemble and reassemble a valve position transmitter in the field. Unless the valve position itself is checked at the time of reassembly and the system recalibrated, the valve position transmitter may be misaligned such that it identifies the wrong valve position. Such an error could have devastating effects. For example, the valve position transmitter disclosed in U.S. Pat. No. 4,494,566 provides for an indicator cover which may be placed upon the device in any of a number of different orientations. Accordingly, if during disassembly and reassembly of this device said cover is rotated ninety degrees without a corresponding change in the valve position, the result is a transmitter identifying a valve position opposite from that which actually exists.

Furthermore, as previously noted, valve position transmitters are often used in environmentally hazardous conditions wherein the corrosive effect on the device is substantial. In addition, repeated disassembly and reassembly of the device itself can result in wear and tear on the various elements of the device. Over the course of time this corrosion and this wear and tear can result in inaccuracies, or a total breakdown, in the device's ability to correctly identify a valve position. Again, this could cause problems in situations where an accurate reading is critical.

On occasion a valve position transmitter may be utilized with a peripheral device that is permanently coupled to the shaft portion of the transmitter. For example, one such device is a positioner. However, the permanent coupling of such a device to the transmitter shaft often times impedes the ability to conduct field work on the transmitter or its various components.

Finally, valve position transmitters often include a switch box assembly containing switches connected to other peripheral devices. Such switches may be used to signal the valve position to these peripheral devices. Again, the conditions under which valve position transmitter are used can cause deterioration of the switch box assembly. Furthermore, the relatively small size of the switch box assemblies may cause difficulties with respect to the field work required to be performed on the switches and their associated connections.

SUMMARY OF THE INVENTION

It is therefore an object of the present invention to overcome the aforementioned disadvantages of prior art systems and provide a valve position transmitter wherein the possibility of misidentification of the valve position by the transmitter upon reassembly is eliminated.

It is a further object of the present invention to provide a valve position transmitter wherein corrosion resulting from the hazardous environment in which said valve position transmitters are often utilized, and wear and tear resulting from the repeated handling of these devices, is minimized.

It is a further object of the present invention to provide a valve position transmitter having a peripheral device permanently coupled to its shaft assembly wherein the presence of said peripheral device does not hinder field work on the transmitter.

It is a further object of the present invention to provide a valve position transmitter with respect to which field work on the switches and associated wiring located in switch box assemblies is made easier and safer to conduct.

These and other objects of the present invention are achieved in a valve position transmitter which is comprised of an indicator assembly having a base with an aperture located thereon, an adjusting ring placed on the base about the aperture, an indicator member capable of identifying the operational position of a remote valve said indicator member being positioned on the adjusting ring, and a transparent cover placed about said indicator and secured to the base of the indicator assembly. Said valve position transmitter also comprising a shaft assembly extending from the point where it may be coupled to a valve through the aperture in the base of the indicator assembly to a point where it engages with the indicator member such that any rotation of the shaft assembly is sensed by said indicator member and some display with respect to such rotation is made. The valve position transmitter may also be comprised of a switch box assembly comprising a housing wherein are located switches for detecting rotation in the shaft member, said switches being electrically connected to a terminal strip and in turn said terminal strip being connected to remote peripheral devices. Said valve position transmitter may also be comprised of a split shaft assembly wherein upper and lower shaft members are provided for such that a peripheral device may be permanently coupled to said upper shaft member and it may be removed along with the upper shaft member to allow for easy field servicing of the remainder of the device.

These and other novel features and advantages of the invention will be described in greater detail in the following detailed description.

BRIEF DESCRIPTION OF THE DRAWINGS

In the drawings, wherein similar reference numerals denote similar elements throughout the several views thereof.

DETAILED DESCRIPTION OF THE INVENTION

Figure 1:
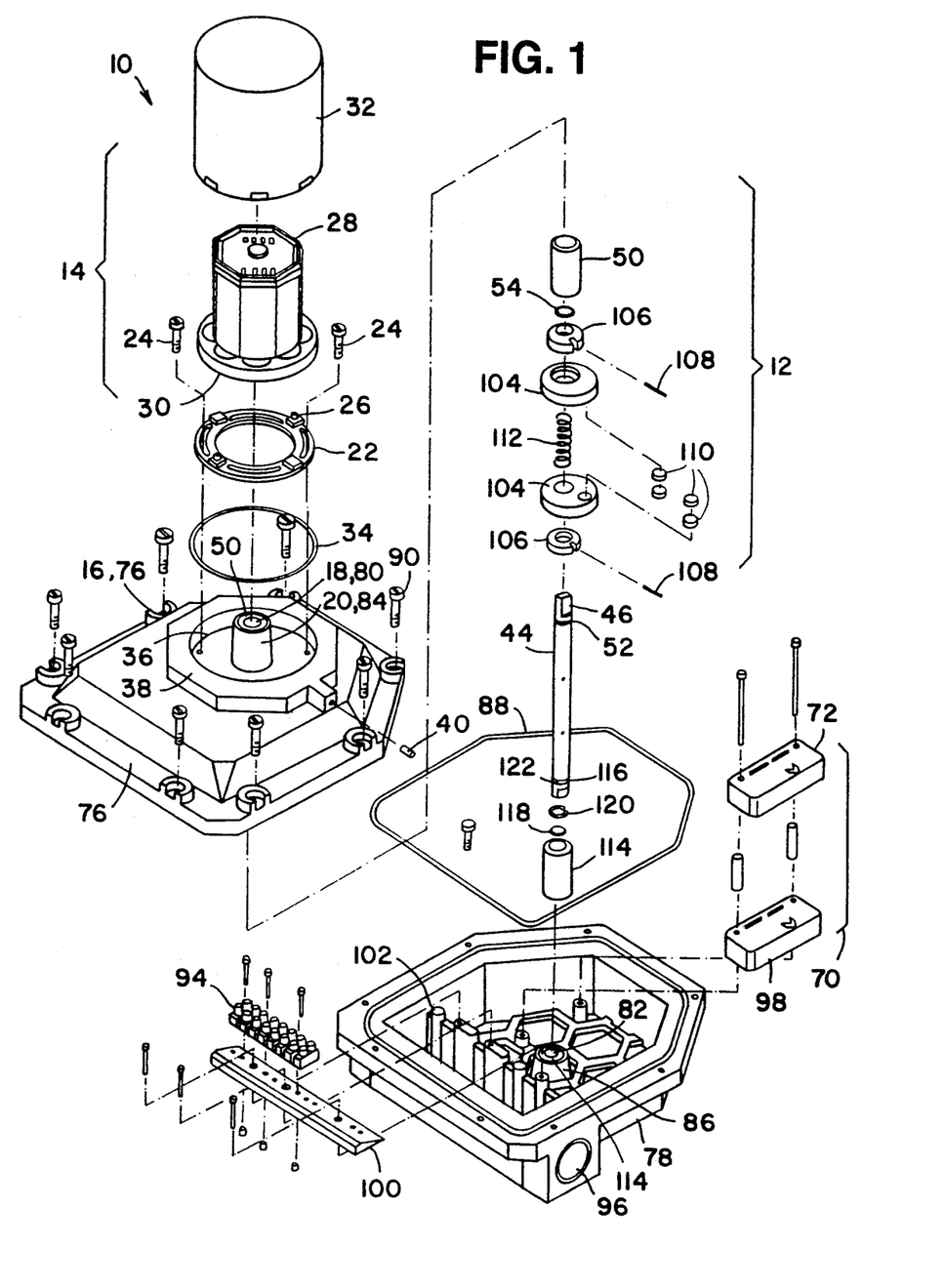
FIG. 1 is an exploded view of the valve position transmitter which is comprised of an indicator assembly and a switch box assembly.

Referring now to the drawings, and in particular to FIG. 1, there is shown a valve position transmitter, generally identified by reference numeral 10, which eliminates the possibility of misidentification of the valve position during in-field reassembly of the device, which minimizes the corrosive and wear and tear effect resulting from the day to day use of the device especially in hazardous environments, and which is designed so as not to hinder field work on its various elements.

The valve position transmitter 10 is generally designed for use in conjunction with a valve assembly or, alternatively and most likely, in conjunction with the combination of an actuator assembly and valve assembly. The valve position transmitter 10 transmits the operational position of a valve located in the valve assembly. The valve position transmitter 10 determines the position of the valve by means of a shaft assembly 12 coupled through one of its elements to the shaft assembly of the valve assembly or of the actuator assembly. It should be noted that neither the actuator assembly nor the valve assembly is an element of the present invention and are therefore not displayed in the accompanying drawings.

The valve position transmitter 10 must be held rigidly in place relative to its position with respect to the valve assembly or actuator assembly to which it is coupled through an element of shaft assembly 12. This is necessary so that the rotation of the element of shaft assembly 12 does not impart rotational movement to the entire valve position transmitter 10. This may be accomplished by means of brackets, mounting lugs or other similar devices secured to any stationary item, including for that matter, the valve assembly or the actuator assembly.

The valve position transmitter 10 is comprised of an indicator assembly 14. The indicator assembly 14 is comprised of an indicator base 16. Situated upon the indicator base 16 is an upper shaft aperture 18. In the preferred embodiment of the present invention, situated about and above said upper shaft aperture 18 is an upper shaft sleeve 20 which is an integral part of the indicator base 16.

The indicator assembly 14 is additionally comprised of an adjustment ring 22 which is secured in place on top of the indicator base 16 and concentrically about said upper shaft aperture 18. Said adjustment ring 22 is secured to the indicator base 16 in such a manner that the adjustment ring 22 may be rotatably moved through an arc of at least 90°. In the preferred embodiment of the present invention said adjustment ring 22 may be rotated a full 360°. This may be accomplished by securing said adjustment ring 22 in place by means of one or more adjusting screws 24 which may be loosened or removed to allow rotation of the adjustment ring 22. Furthermore, situated upon the top of said adjustment ring 22 is one or more protrusions 26 that operate as orientation pins.

The indicator assembly 14 is additionally comprised of an indicator member 28 which presents a visual display indicative of the operating position of the valve of the valve assembly. The indicator member 28 is positioned upon the top of the adjustment ring 22. The bottom of said indicator member 28 includes one or more orientation indents 30. The number and relative location of said orientation indents 30 coincide with the number and relative location of the protrusions 26 on said adjustment ring 22 and are positioned in such a manner that the indicator member 28 can only be situated upon the adjustment ring 22 in at most two orientations, each of said two orientations being 180° rotationally disposed from the other. The interaction of the protrusions 26 and the orientation indents 30 secure the indicator member 28 upon the adjustment ring 22. In the preferred embodiment of the present invention there are at least two protrusions 26 and corresponding orientation indents 30. This allows the stresses resulting from the operation of the present invention to be better distributed and absorbed throughout the entire indicator assembly 14.

The indicator assembly 14 is also comprised of a transparent cover 32 which is placed about said indicator member 28 and secured to the indicator base 16. Many prior art devices fail to provide a clearly observable indication of valve status. Often times this is due to the utilization of indication means not observable from all directions. For example, in some prior art devices the view of the entire surface of the indication means may be blocked by some other element of the device. The prior art device disclosed in U.S. Pat. No. 4,494,566 utilizes a cover wherein a portion of its surface is opaque. While this is an integral feature of this device, it nevertheless reduces the overall surface area of the device capable of indicating the valve status. In the present invention, the use of a transparent cover 32 allows for the viewing of 100% of the surface of the indication means, thereby greatly increasing the usefulness of the device.

In the preferred embodiment of the present invention an O-ring 34 is provided to act as a compression seal between said transparent cover 32 and said indicator base 16. This seal protects against corrosion to the elements of the indicator assembly 14 resulting from the environmentally hazardous conditions in which the present invention is often utilized. Furthermore, the use of a seal helps protect against dirt and/or condensation from collecting on the interior surface of said transparent cover 32, thereby protecting against obstructed viewing of the indicator member 28. Said O-ring 34 is situated in an O-ring indent 36 situated upon said indicator base 16 concentrically about said upper shaft aperture 18 and said adjustment ring 22. In the preferred embodiment of the present invention said indicator base 16 is also comprised of a seating ridge 38 which is an integral part of said indicator base 16. Said seating ridge 38 protrudes from the top of said indicator base 16 about said upper shaft aperture 18 and conforms in shape to, and is slightly larger in size than, the bottom edge of said transparent cover 32. The O-ring 34 and O-ring indent 36 are enclosed by said seating ridge 38 thereby facilitating the positioning of said transparent cover 32 upon said indicator base 16. Furthermore, the seating ridge 38 may be used to facilitate removably securing said transparent cover to said indicator base 16. For example, a moveable detent 40 positioned in the seating ridge 38 and capable of being moved against said transparent cover 32 may be utilized to lock the transparent cover 32 in place upon said indicator base 16. Alternatively, the inner surface of the seating ridge 28 may be configured to cooperate with base ridges situated on said transparent cover 32 so that said transparent cover 32 may be snapped in and out of said seating ridge 38 thereby eliminating the need for auxiliary fasteners.

As previously noted, the valve position transmitter 10 is comprised of a shaft assembly 12. Said shaft assembly 12 is comprised of a rotatable shaft member 44. The lower end of said shaft member 44 is coupled by conventional means to an upper end of a valve assembly shaft or, alternatively, to the upper end of an actuator assembly shaft which in turn is coupled to the valve assembly shaft. As a result of this, a change in valve position will result in the rotation of the various shafts including the shaft member 44.

The combination of the shaft assembly 12 and the indicator assembly 14 allows for the operation of the present valve position transmitter 10. In particular, the shaft member 44 passed through the upper shaft aperture 18 situated in the indicator base 16 so as to engage said indicator member 28 in such a way that a rotation in said shaft member 44 is detected by said indicator member 28. If this occurs, the rotation of the shaft member 44 will be reflected by a change in the visual display of indicator member 28 indicative of the change in the valve's operational position. The change in the visual display may be observed through the transparent cover 32.

The engagement between said shaft member 44 and said indicator member 28 is accomplished by the insertion of the tip 46 of the shaft member 44 into a slot 48 situated within said indicator member 28. Furthermore, the tip 46 and slot 48 are each configured so that said indicator member 28 can only be placed on said shaft member 44 in no more than two orientations, each of said two orientations being 180° rotationally disposed from the other.

In order to properly operate the valve position transmitter 10, there must be an initial calibration of the indicator member 28 with the position of the valve in the valve assembly. The shaft assembly 44, as previously noted, is coupled by conventional means to the valve shaft assembly or, alternatively to the actuator shaft assembly which in turn is conventionally coupled to the valve shaft assembly A change in the valve position from fully open to fully closed or, alternatively, from fully closed to fully open results in a ninety degree rotation of the coupled shaft assemblies and, therefore, the shaft member 44. In order to calibrate the device the position of the valve at the time of calibration must be a known variable. While no specific valve position is required, to ensure the most accurate calibration of the device the valve should be either fully closed or fully open.

The valve position transmitter 10 is calibrated after the shaft member 44 is initially coupled to said valve assembly and engaged with the indicator member 28 which in turn is positioned on said adjustment ring 22. In all probability the valve position displayed by the indicator member 28 at this time does not match the actual valve position. Accordingly, a change in the valve position displayed by the indicator member 28 must be made. Such a change occurs when the indicator member 28 detects a rotation of the shaft member 44. The shaft member 44 cannot be rotated, however, because to do so would change the valve position. Accordingly, the indicator member 28 must be rotated relative to said shaft member 44.

Therefore, keeping the shaft member 44 stable, the indicator member 28 and adjustment ring 22 are rotated about said shaft member 44 until the indicator member 28 displays the existing condition of the valve, i.e. open, closed. The indicator member 28 needs to be turned no more than a quarter turn since it will have detected a 90° rotation of the shaft member 44 after a quarter turn and will have displayed the full range of valve positions.

It is necessary to rotate the adjustment ring 22 along with the indicator member 28 because the protrusions 26 on said adjustment ring 22 and the orientation indents 30 on said indicator member 28 only allow these two elements to be secured together in no more than two orientations that are 180° rotationally disposed from the other. The rotation of these two elements is accomplished by the loosening of the adjusting screw 24. Once the existing condition of the valve is displayed by the indicator member 28, the adjusting screw 24 is again tightened so that the adjustment ring 22 is securely fastened to said indicator base 16.

Once the calibration has been made, the indicator member 28 can be removed from the shaft member 44 as often as desired without risking the misalignment of the indicator member 28 upon its reinsertion. The reasons for this is as follows: If a change in valve position occurs while the indicator member has been removed, there will have been a corresponding rotation of the shaft member 44. When the indicator member 28 is reinserted the configuration of the tip 46 and slot 48 will limit its placement on the shaft member 44 so that it will have to be rotated to fit thereon. Upon its placement on the shaft member 44, however, the valve position display will not match the existing valve position. Furthermore, the indicator member 28 cannot then be secured to the adjustment ring 22 since the protrusions 26 and the orientation indents 30 no longer are aligned. When, however, the indicator member 28 is then rotated to align said protrusions 26 and said orientation indents 30 it will detect a rotation relative to the shaft member 44 which remains stationary due to other forces, such as frictional forces of the shaft assemblies to which said shaft member 44 is coupled. As this rotation is detected the valve position display will change and at the point said protrusions 26 and said orientation indents 30 are aligned, the existing valve position will then be displayed.

Finally, it should be noted that regardless of which of the two orientations—each of which is 180° rotationally disposed from the other—for the insertion of the tip 46 and slot 48 occurs, and regardless of which of the two orientations—again each of which is 180° rotationally disposed from the other—for the placement of said indicator member 28 on said adjustment ring 22 occurs; the result will be the same. This is true because a rotation of the shaft member 44 through 180° represents an initial valve position and a final valve position that are exactly the same.

The preferred embodiment of the present invention also includes a variety of additional elements. For example, the indicator assembly 14 may also comprise a tubular first shaft bearing 50. Said first bearing 50 is secured within said upper shaft sleeve 20 and is configured so as to minimize the horizontal movement of said shaft member 44 as it passes therethrough thereby eliminating stresses thereon. In the preferred embodiment of the present invention said first shaft bearing is made from an aluminum —nickel alloy. This feature provides for superior wear and run characteristics. Furthermore, this alloy occupies the same position in the electrochemical series as the indicator base 16 thereby preventing galvanic corrosion.

Furthermore, in the preferred embodiment of the present invention the shaft assembly 12 also comprises a first O-ring shaft indent 52 and a first shaft O-ring 54 situated in said first shaft indent 52. Upon placement of said shaft assembly 12 through said indicator assembly 14 said first O-ring 54 acts as a seal between said shaft assembly 12 and said upper shaft sleeve 20.

Figure 2:
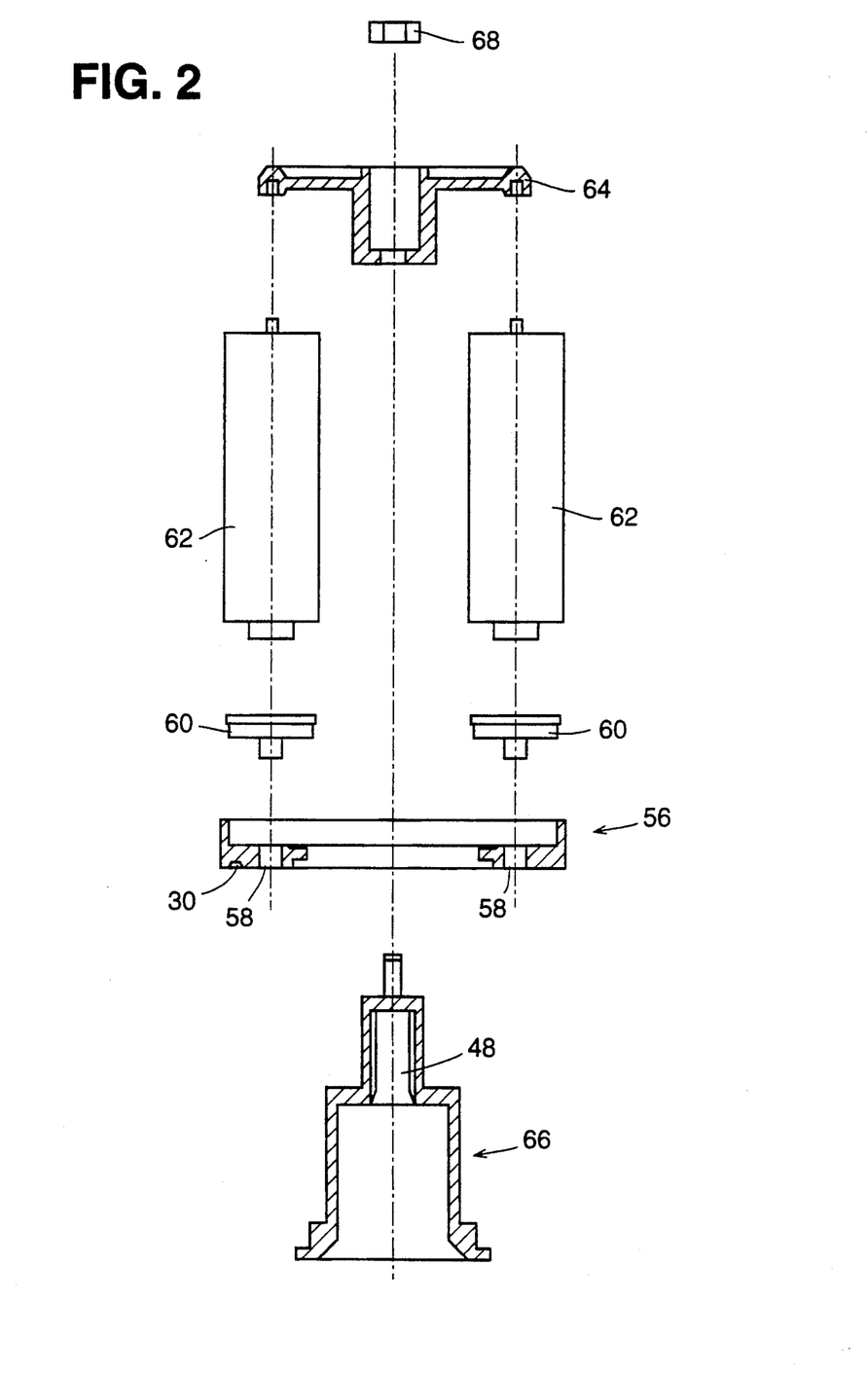
FIG. 2 is an exploded cross-sectional view of the indicator member.
Figure 3:
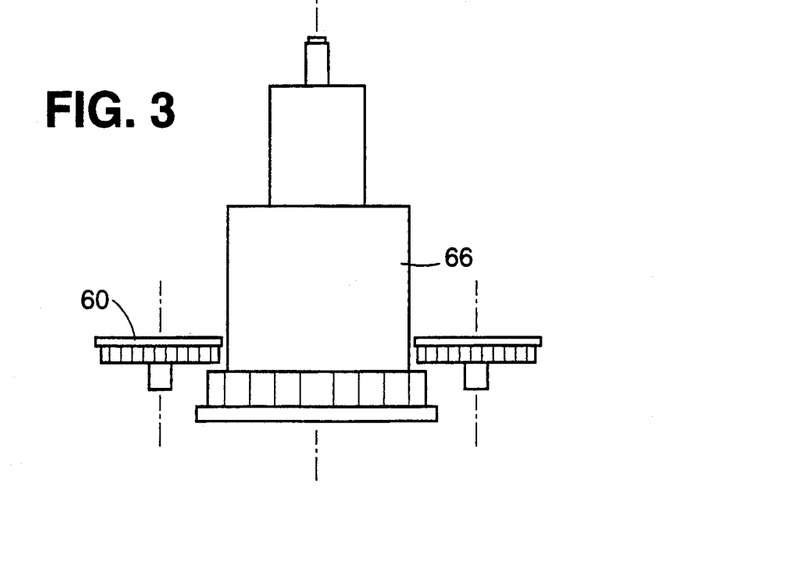
FIG. 3 is a side view of the driver and several vane gears of the indicator member.
Figure 4:
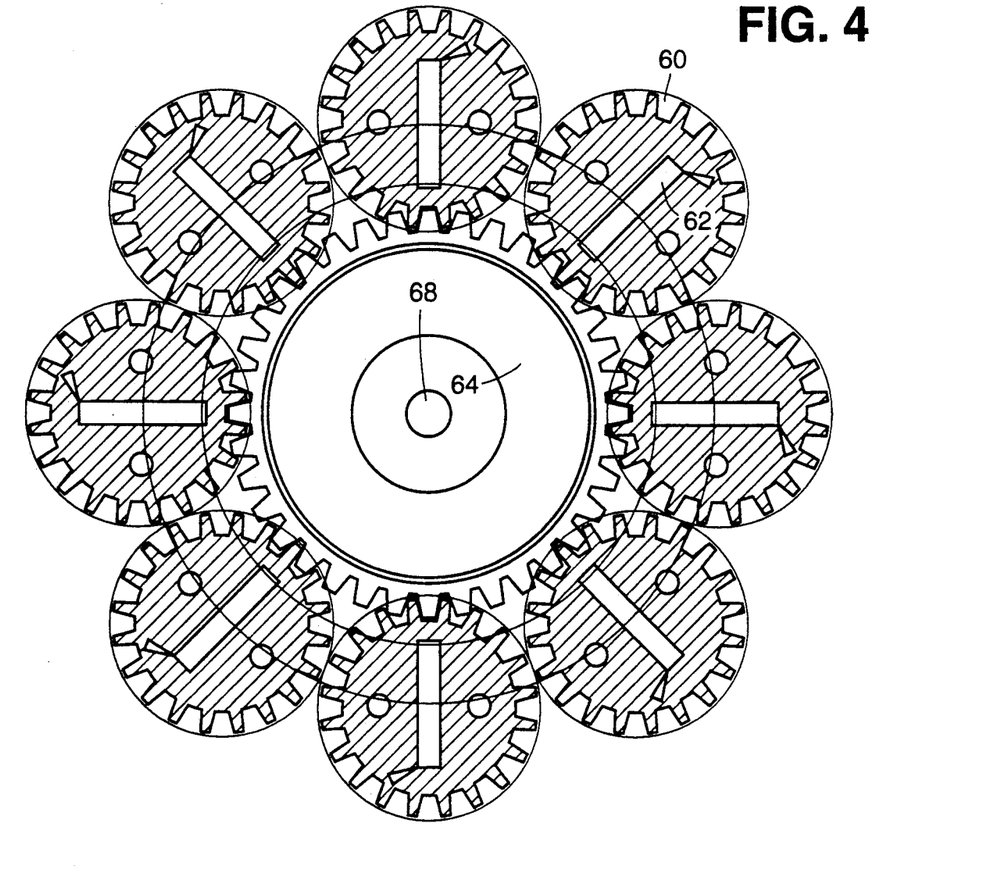
FIG. 4 is a overhead view of the driver and vane gears of the indicator member.

As noted above, the indicator member 28 displays changes in valve position upon detecting a rotation in said shaft member 44. As illustrated in FIGS. 2 through 4, the indicator member 28 in the preferred embodiment of the present invention is comprised of a ring shaped base plate 56. Situated upon said base plate 56 are one or more grooves 58 wherein a corresponding number of vane gears 60 are rotatable within said grooves 58 and the outer edge of each vane gear 60 is comprised of gear teeth. Secured to the top of each vane gear 60 is a display vane 62 which in turn is rotatably secured to an indicator cap 64.

Each display vane 62 has on one of its sides words, colors, characters and/or some other display indicating an open valve. On the opposite side of each display vane 62 are other words, colors, characters and/or some other display indicating a closed valve. The display vanes 62 are situated so that the side of each display vane 62 reflecting a particular valve position has the same orientation as all others, i.e. all facing out, in, etc. Furthermore, the top of each vane gear 60 has a color or other display on each semicircle that reflects the valve position indicated by the side of the display vane 62 facing said semicircle. Since the indicator cap 64 blocks the view from above the device of the inner half of each vane gear 60, the displays on the tops of the vane gear 60 allows a determination regarding valve position to be made by viewing the device from above. What is observed is the display on each vane gear 60 associated with the outwardly facing side of the display vane 62.

The indicator member 28 is also comprised of a driver 66. The driver 66 is a generally cone-shaped, hollow element. The driver 66 is rotatably secured to the indicator cap 64 by means of an indicator nut 68. About the exterior of the base of said driver 66 are situated a multiplicity of gear teeth. When the driver 66 is secured to said indicator cap 64, the gear teeth about its exterior base engage with the gear teeth of each vane gear 60. Finally, the slot 48 referred to above is situated within the interior of said driver 66.

The manner in which this indicator member 28 works is as follows: When a shaft member 44, which is in engagement with said slot 48, begins to rotate, the driver 66 will also begin to rotate. As this occurs the engagement of the driver's 66 gear teeth and those of each vane gear 60 causes each vane gear 60 to rotate When this happens the same change in orientation of each display vane 62 situated on the vane gears 60 simultaneously occurs. This causes a change in the display observable by an individual. Furthermore, the gear ratio between the driver 66 and the vane gears 60 is chosen to be two to one. Therefore, a rotation of 90° by the driver 66 (reflecting a change in a valve from open to closed) results in a 180° rotation by a vane gear 60 which results in a turn in the display vane 62 from one side to the other.

A more versatile valve position transmitter 10 exists when it comprises, in addition to said shaft assembly, a switch box assembly 70. By incorporating switches 72 into the present invention, the operational position of the valve can be transmitted to remote peripheral devices.

Referring now to FIG. 1, the switch box assembly 70 is comprised of one or more switches 72 enclosed within a housing consisting of an upper housing member 76 secured to a lower housing member 78. The upper housing member 76 has a first housing shaft aperture 80 situated thereon and said lower housing member 78 has a second housing shaft aperture 82 situated thereon. In the preferred embodiment of the present invention the upper housing member 76 includes a first housing shaft sleeve 84 that protrudes and is concentric with said first housing shaft aperture 80. Said first housing shaft sleeve 84 is an integral part of said upper housing member 76. Similarly, in the preferred embodiment of the present invention said lower housing member 78 includes a lower housing shaft sleeve 86 situated about and protruding above and concentric with said lower housing aperture 82. Said lower housing shaft sleeve 86 is an integral part of said lower housing shaft member 78. Furthermore, in the preferred embodiment of the present invention and as illustrated in FIG. 1, the same element may act as the upper housing member 76 and the indicator base 16. Similarly, in such a situation, the same elements perform as the preferred components of the indicator base 16 as well as the preferred components of the upper housing member 76.

Furthermore, in the preferred embodiment of the present invention a seal 88 is situated between said upper housing member 76 and said lower housing member 78. Said seal 88 provides waterproofing and protection from the hazardous environment in which the valve position transmitter 10 is utilized. Furthermore, in the preferred embodiment of the present invention the upper housing member 76 and the lower housing member 78 are secured together by means of one or more securing screws 90. Said securing screws 90 are non-removable from said housing, thereby preventing accidental loss during field servicing. Furthermore, said securing screws 90 are surrounded by hooded barriers which are an integral part of said lower housing member 78. This aspect protects said sealing screws 90 from mechanical damage. Finally, as illustrated in FIG. 1, said securing screws 90 have a conical shape just below the screwheads. This feature seals off the internal threads from corrosion and facilitates factory perfect alignment upon reassembly in the field. This last feature reduces stress on other components of the present device which would result if the two housing components were not perfectly aligned. Finally, in the preferred embodiment of the present invention said sealing screws 90 are made of stainless steel.

The switches 72 in the switch box assembly 70 can be any of a number of different types of switches. For example, without limitation, said switches can include mechanical limit switches and magnetic reed switches. The switches 72 are utilized to detect the rotation of the shaft member 44 and to transmit a signal to a peripheral device. Such peripheral devices are not elements of the present invention.

This signal is generally transmitted through the wiring associated with the switches 72, said wiring being fastened to a terminal strip 94 situated within said housing. In turn said signal is then transmitted through the terminal strip 94 through wiring leading through one or more signal apertures 96 located on the face of said housing.

In the preferred embodiment of the present invention each switch 72 is enclosed within a switch housing 98. This feature protects against the accidental grounding of the switch wires of a live switch wire during field servicing. Furthermore, in the preferred embodiment of the present invention the terminal strip 94 is situated upon a terminal strip base 100 which in turn is situated upon a terminal barrier mount 102 that is an integral part of said lower housing member 78. Said terminal barrier mount 102 provides a barrier for and insulates the wiring and any work that has to be done thereon from the shaft area within the housing. Furthermore, the terminal strip base 100 is made fairly large in order to allow redundant labeling thereon. Such a feature facilitates field servicing with respect to terminating switch wires on said terminal strip 94. Such redundant marking can include terminal numbers, component names, and industry standard wiring color codes. Furthermore, said terminal strip base 100 is angled or oriented so as to make the terminal strip 94 more accessible to field servicing.

As previously noted, the switches 72 are used to detect rotation of the shaft member 44. The detection of the rotation of said shaft member 44 is accomplished by means of cams 104 positioned on said shaft member 44. Said cams 104 are mounted on sliding splines 106. Closely coupled sliding splines 106 are used to allow additional cams for purposes of minimizing the necessary enclosure height. The sliding splines 106 utilize a spring pin 108 for purposes of holding the cams 104 in place. The type of switch 72 illustrated in FIG. 1 is a reed switch actuated by an external magnetic driver. The reed switch magnets 110 are embedded in the cams 104 to prevent dislodging and disabling of the system.

As with the indicator member 28, the switches must be calibrated at the time the valve position transmitter 10 is first coupled to the valve or the valve assembly. As shown in FIG. 1, said shaft member 44 extends through the lower housing shaft aperture 82 through the housing interior and through the upper housing shaft aperture 80. As just noted, within the interior of said housing secured to shaft member 44 are the sliding spline 106/cam 104 assemblies as noted in FIG. 1. There may also be utilized a spring 112 which facilitates the positioning of said splines 106 on said shaft member 44.

The preferred embodiment of the present invention also includes a variety of additional elements. For example, the switch box assembly 70 may also comprise a tubular second shaft bearing 114. Said second bearing 114 is secured within said lower housing shaft sleeve 86 and is configured so as to minimize the horizontal movement of said shaft member 44 as it passes therethrough, thereby eliminating stresses thereon. As with first bearing 50 said second bearing 114 may be made from an aluminum-nickel alloy. Furthermore, in the preferred embodiment of the present invention the shaft assembly 12 also comprises a second O-ring shaft indent 116 and a second shaft O-ring 118 situated in said second shaft indent 116. Upon placement of said shaft assembly 12 through said switch box assembly 70, said second O-ring 118 acts as a seal between said shaft assembly 12 and said lower housing shaft sleeve 86. In the event said upper housing member 76 and said indicator base 16 are in fact two separate elements within a particular valve position transmitter 10, then another combination of the shaft O-ring and accompanying indent may be utilized in cooperation with said upper housing shaft sleeve 84.

Figures 5, 6:
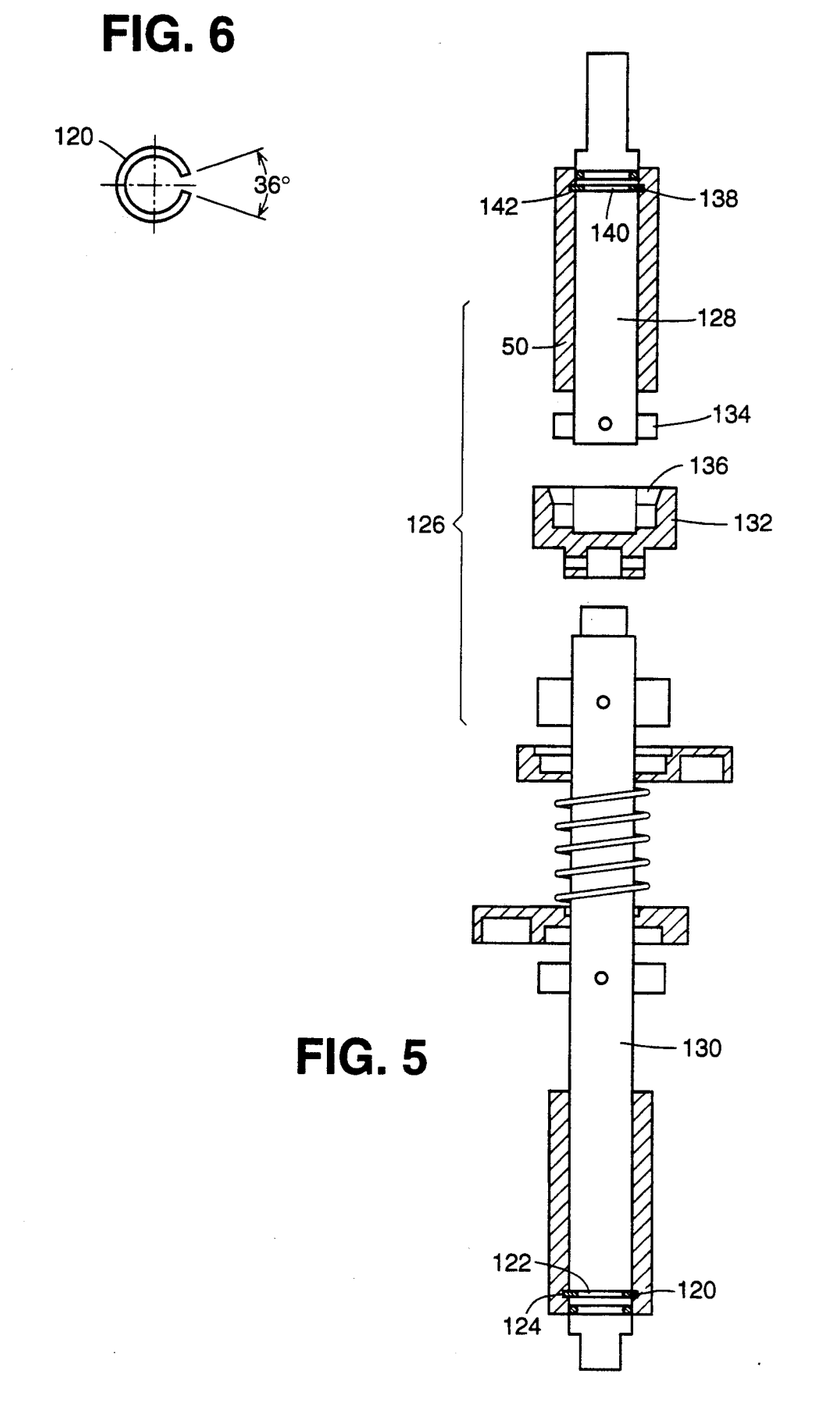
FIG. 5 is an exploded cross-sectional view of a split shaft assembly.
FIG. 6 is an overhead view of a locking ring.

Finally, since it will not be necessary to remove the shaft assembly 44 from the lower housing member 78 after the device is assembled, an additional element that may be included in the embodiment of the present invention is an internal stainless steel locking ring 120. Such a locking ring 120 is illustrated in FIG. 6. Generally said locking ring 120 is placed about a first locking groove 122 situated on said shaft member 44. It has been determined that by providing a gap in said locking ring 120 of approximately 36° the maximum protection is obtained from said locking ring 120 without risking deforming said locking ring 120 upon insertion about said first locking groove 122. A second locking groove 124 is situated on the interior face of said tubular second shaft bearing 114. Accordingly, as it is positioned within said valve position transmitter 10 said shaft member 44 is effectively locked in place when said locking ring 120 becomes secured within said first locking groove 122 and said second locking groove 124. This feature provides protection for the entire device from external environmental conditions and more importantly provides enhanced strength to the shaft assembly by reducing vertical motion to the difference between the tolerance between the locking grooves 122, 124 and locking ring 120. In the preferred embodiment of this invention, such a feature reduces the vertical motion to less than 0.001 inches.

On occasion, peripheral devices may be attached to the shaft member 44 of the shaft assembly 12. Said peripheral devices are generally used in conjunction with the valve position transmitter 10 but are not an element of the present invention. One such peripheral device, for example, is a positioner. On occasion, the coupling of said peripheral device to said shaft member 44 is permanent or, if not, proves to be quite difficult to undo. Accordingly, it then becomes necessary to conduct field servicing without the benefit of removing such peripheral devices. Needless to say, this can cause substantial difficulties in correctly performing the necessary field services. This problem has been addressed by the utilization of a split shaft assembly 126 as illustrated in FIG. 5. The split shaft assembly 126 is generally comprised of an upper shaft member 128 and a lower shaft member 130. In addition, a coupler 132 is utilized for purposes of removably securing said upper shaft member 128 to said lower shaft member 130. By using a split shaft assembly 126 such a peripheral device may be permanently coupled to said upper shaft member 128 and may be removed away from the switch box assembly when field service must be provided by means of separating said upper shaft member 128 away from the coupler 132.

Due to limitations pertaining to said peripheral devices it may on occasion be necessary to insure that upon reassembly the upper shaft member 128 be placed in the same alignment with said lower shaft member 130 as existed at the time the upper shaft member 128 was removed. To insure proper alignment, protrusions 134 are situated upon the upper shaft member 128 which conform in size and location with recesses 136 in said coupler 132. The number and location of protrusions 134 and recesses 136 are selected so as to insure that only one possible alignment can be made. Finally, when a split shaft assembly 126 is utilized, a second locking ring 138 may be situated at the upper end of said shaft assembly 12 such that in cooperation with a third locking groove 140 situated on said shaft member 44 and a fourth locking groove 142 situated on the interior of said first shaft bearing 50 to lock said upper shaft member 28 within said first shaft bearing 50.

In the foregoing specification, the invention has been described with reference to a specific exemplary embodiment thereof. It will, however, be evident that various modifications and changes may be made thereunto without departing from the broader spirit and scope of the invention as set forth in the appended claims: The specifications and drawings are, accordingly, to be regarded in an illustrative rather than in a restrictive sense.

What is claimed is:

1. A valve position transmitter which is comprised of:
   (A) an indicator assembly comprising
      (i) an indicator base having a shaft aperture located therein,
      (ii) an adjustment ring secured on top of said indicator base concentrically about said shaft aperture, said adjustment ring having at least one protrusion rising from its surface,
      (iii) an indicator member capable of presenting a visual display indicative of the operating position of a valve, said indicator member positioned on top of said adjustment ring and said indicator member having at least one orientation indent in its bottom surface, said orientation indents conforming in size and relative location to said protrusions of said adjustment ring,
      (iv) a transparent cover placed about said indicator member and secured to said indicator base concentrically about said shaft aperture, and
   (B) a shaft assembly comprising
      (i) a shaft member extending from a point at which it may be coupled to a remote shaft assembly through the shaft aperture of said indicator base and to a point in which it engages said indicator member in a manner such that said indicator member may detect any rotation in said shaft member.

2. The valve position transmitter recited in claim one which also comprises a switch box assembly comprising
   (i) a switch housing comprised of an upper housing member having a shaft aperture situated thereon and a lower housing member having a shaft aperture situated thereon, said upper housing member being secured to said lower housing member,
   (ii) one or more switches situated in said housing capable of detecting the rotation of said shaft member,
   (iii) a terminal strip base situated within said housing, said terminal strip base having redundant markings thereon to facilitate electrical terminations and said terminal strip base further being positioned on an angle relative to the base of said housing,
   (iv) a terminal strip situated on said terminal strip base for connecting switch wiring to wiring associated with remote peripheral devices, and
   (vi) a locking ring for locking said shaft member within said shaft aperture of said lower housing member.

3. The valve position transmitter recited in claim two which also comprises a second sealing member situated between said upper housing member and said lower housing member.

4. The valve position transmitter recited in claim two wherein said indicator base constitutes the upper housing member.

5. The valve position transmitter recited in claim one which also comprises a split shaft assembly comprising
   (i) an upper shaft member having one or more protrusions extending from its base,
   (ii) a lower shaft member,
   (iii) a coupler for securing said upper shaft member to said lower shaft member said coupler having one or more recesses therein that conform in number, size and relative position to the protrusions extending from said upper shaft member such that there is only one alignment in which said upper shaft member may be placed into said coupler, and
   (iv) a locking ring for placement upon said upper shaft member whereby said upper shaft member is locked wherein said shaft aperture of said indicator base.

6. The valve position transmitter recited in claim one wherein said adjustment ring may be rotatably moved at least 90°.

7. The valve position transmitter recited in claim one wherein said adjustment ring may be rotatably moved 360°.

8. The valve position transmitter recited in claim one wherein said adjustment ring is secured on top of said indicator base by means of at least one adjustment screw.

9. The valve position transmitter recited in claim one wherein said orientation indents in said indicator member and said protrusions of said adjustment ring are positioned in such a manner that the indicator member can only be positioned on top of said adjustment ring in at most two orientations, each of said two orientations being 180° rotationally disposed from the other.

10. The valve position transmitter recited in claim one wherein there are at least two indents in said indicator member and at least two protrusions on said adjustment ring.

11. The valve position transmitter recited in claim one wherein said shaft member can only engage said indicator member in at most two orientations, each of said two orientations being 180° rotationally disposed from the other.

12. The valve position transmitter recited in claim one wherein said indicator member is comprised of:
   (i) a circular base plate having at least one groove situated thereon,
   (ii) at least one vane gear, each said vane gear rotatably positioned within a groove on said circular base plate and each said vane gear having gear teeth situated on its outer edge,
   (iii) at least one display vane, each said display vane secured at its bottom edge to a vane gear and extending vertically above said vane gear, each said display vane having two opposing sides each of said opposing sides indicating opposite operating positions of a remote valve, and each said display vane oriented in the same manner as all other display vanes so as to provide the same indication of the operation position of said remote valve,
   (iv) a driver having a circular base, said circular base having gear teeth situated on its outer edge such that the gear teeth of said circular base engage the gear teeth of said vane gears and such that a 90° rotation of the driver results in a 180° rotation in the vane gear, and said driver also having a body extending vertically above its circular base, (v) an indicator cap secured to the top of said driver body such that said driver is rotatable relative to the stationary position of the indicator cap, said indicator cap further being secured to the upper edge of each of said display vanes such that each of said display vanes is rotatable relative to the stationary position of the indicator cap, and said indicator cap being configured such that when the present valve position transmitter is viewed from above said indicator cap blocks the view of the inwardly facing half of the upper surface of each of said vane gears.

13. The valve position transmitter recited in claim one wherein said indicator base also comprises:
   (i) an upper shaft sleeve extending above and about said shaft aperture, said upper shaft sleeve being an integral part of said indicator base, and
   (ii) a first shaft bearing secured within said upper shaft sleeve.

14. The valve position transmitter recited in claim one which also comprises a first sealing member situated between said transparent cover and said indicator base.

15. A valve position transmitter which is comprised of:
   (A) an indicator assembly comprising:
      (i) an indicator base having a shaft aperture located therein,
      (ii) an adjustment ring secured on top of said indicator base about said shaft aperture, said adjustment ring having at least one protrusion rising from its surface and said adjustment ring being capable of being rotatably moved at least 90°,
      (iii) an indicator member capable of presenting a visual display indicative of the operating position of a valve, said indicator member positioned on top of said adjustment ring and said indicator member having at least one orientation indent in its bottom surface, said orientation indents conforming in size and relative location to said protrusions of said adjustment ring, and said orientation indents and said protrusions being positioned in such a manner that the indicator member can only be positioned on top of said adjustment ring in at most two orientations, each of said two orientations being 180° rotationally disposed from the other,
   (B) a shaft assembly comprising
      (i) a rotatable shaft member extending from a point at which it may be coupled to a remote shaft assembly through the shaft aperture of said indicator base and to a point in which it engages said indicator member in a manner such that said indicator member may detect any rotation in said shaft member, said shaft member and said indicator member being capable of being engaged in at most two orientations, each of said orientations being 180° rotationally disposed from the other.

16. The valve position transmitter recited in claim also comprises as transparent cover placed about said indicator member and removably secured to said indicator base about said shaft aperture.

17. The valve position transmitter recited in claim 16 which also comprises a first sealing member situated between said transparent cover and said indicator base.

18. The valve position transmitter recited in claim 15 wherein said adjustment ring may be rotatably moved 360°.

19. The valve position transmitter recited in claim 15 wherein said adjustment ring is secured on top of said indicator base by means of at least one adjustment screw.

20. The valve position transmitter recited in claim 15 wherein said adjustment ring has at least two protrusions and wherein said indicator member has at least two orientation indents.

21. The valve position transmitter recited in claim 15 wherein said indicator member is comprised of:
   (i) a circular base plate having at least one groove situated thereon,
   (ii) at least one vane gear, each said vane gear rotatably positioned within a groove on said circular base plate and each said vane gear having gear teeth situated on its outer edge,
   (iii) at least one display vane, each said display vane secured at its bottom edge to a vane gear and extending vertically above said vane gear, each said display vane having two opposing sides each of said opposing sides indicating opposite operating positions of a remote valve, and each said display vane oriented in the same manner as all other display vanes so as to provide the same indication of the operation position of said remote valve,
   (iv) a driver having a circular base, said circular base having gear teeth situated on its outer edge such that the gear teeth of said circular base engage the gear teeth of said vane gears and such that a 90° rotation of the driver results in a 180° rotation in the vane gear, and said driver also having a body extending vertically above its circular base,
   (v) an indicator cap secured to the top of said driver body such that said driver is rotatable relative to the stationary position of the indicator cap, said indicator cap further being secured to the upper edge of each of said display vanes such that each of said display vanes is rotatable relative to the stationary position of the indicator cap, and said indicator cap being configured such that when the present valve position transmitter is viewed from above said indicator cap blocks the view of the inwardly facing half of the upper surface of each of said vane gears.

22. The valve position transmitter recited in claim 15 wherein said indicator base also comprises
   (i) an upper shaft sleeve extending above and about said shaft aperture, said upper shaft sleeve being an integral part of said indicator base, and
   (ii) a first shaft bearing secured within said upper shaft sleeve.

23. The valve position transmitter recited in claim 15 which also comprises a switch box assembly comprising
   (i) a switch housing comprised of an upper housing member having a shaft aperture situated thereon and a lower housing member having a shaft aperture situated thereon, said upper housing member being secured to said lower housing member,
   (ii) one or more switches situated in said housing capable of detecting the rotation of said shaft member.

24. The valve position transmitter recited in claim 23 which also comprises a second sealing member situated between said upper housing member and said lower housing member.

25. The valve position transmitter recited in claim 23 wherein said indicator base constitutes the upper housing member.

26. The valve position transmitter recited in claim 23 wherein each of said switches is situated within a switch housing.

27. The valve position transmitter recited in claim 23 which also comprises
 (i) a terminal barrier situated within siad housing,
 (ii) a terminal strip base positioned on said terminal barrier, said terminal strip base being positioned on an angle relative to said terminal barrier, and
 (iii) a terminal strip situated on said terminal strip base for connecting switch wiring to wiring associated with remote peripheral devices.

28. The valve position transmitter recited in claim 23 which also comprises a first locking ring for locking said shaft member within said shaft aperture of said lower housing member.

29. The valve position transmitter recited in claim 23 which also comprises
 (i) at least one sliding spline positioned on said shaft member within said switch housing, and
 (ii) at least one cam positioned on a sliding spline.

30. The valve position transmitter recited in claim 15 wherein said shaft member is a split shaft member comprising
 (i) an upper shaft member having one or more protrusions extending from its base, and
 (ii) a lower shaft member removably secured to the base of said upper shaft member at its upper surface, said lower shaft member having one or more recesses on its upper surface that conform in number, size and relative position to the protrusions extending from the base of said upper shaft member.

31. The valve position transmitter recited in claim 30 wherein said upper shaft member is locked in place within said shaft aperture of said indicator base and wherein said lower shaft member is locked in place within said shaft aperture of said lower housing member.

32. The valve position transmitter recited in claim 30 wherein there is only one alignment in which said upper shaft member can be secured to said lower shaft member.

* * * * *